(12) United States Patent
Tolhuizen et al.

(10) Patent No.: US 11,451,381 B2
(45) Date of Patent: Sep. 20, 2022

(54) REACHING AGREEMENT ON A SECRET VALUE

(71) Applicant: KONINKLIJKE PHILIPS N.V., Eindhoven (NL)

(72) Inventors: Ludovicus Marinus Gerardus Maria Tolhuizen, Waalre (NL); Ronald Rietman, Eindhoven (NL); Oscar Garcia Morchon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 629 days.

(21) Appl. No.: 16/347,366

(22) PCT Filed: Oct. 31, 2017

(86) PCT No.: PCT/EP2017/077843
§ 371 (c)(1),
(2) Date: May 3, 2019

(87) PCT Pub. No.: WO2018/083075
PCT Pub. Date: May 11, 2018

(65) Prior Publication Data
US 2019/0349192 A1  Nov. 14, 2019

(30) Foreign Application Priority Data

Nov. 4, 2016  (EP) .................................. 16197277

(51) Int. Cl.
*H04L 9/32* (2006.01)
*H04L 9/08* (2006.01)

(52) U.S. Cl.
CPC .......... *H04L 9/0841* (2013.01); *H04L 9/0819* (2013.01)

(58) Field of Classification Search
CPC .... H04L 9/0838; H04L 9/0819; H04L 9/0841
(Continued)

(56) References Cited

U.S. PATENT DOCUMENTS 7,502,930 B2 * 3/2009 Gehrmann ............ H04L 9/0841
380/277
8,549,299 B2 * 10/2013 Struik ................... H04L 9/0844
713/171

(Continued)

OTHER PUBLICATIONS

PCT/EP2017077843, ISR and Written Opinion, dated Feb. 5, 2018.
(Continued)

*Primary Examiner* — Amare F Tabor

(57) ABSTRACT

A first device and a second device are disclosed for reaching agreement on a secret value. Herein, the second device comprises a receiver configured to receive information indicative of a reconciliation data h from the first device, a processor configured to compute a common secret s based on an integer value b, an equation, and system parameters. The processor is configured to compute b based on a key exchange protocol. The first device has a number a in approximate agreement with the number b. The first device comprises a processor configured to determine a common secret s based on an integer value a an equation, and system parameters, and determine a reconciliation data h. The first device further comprises a transmitter configured to transmit information indicative of the reconciliation data h to the second device.

17 Claims, 5 Drawing Sheets

(58) Field of Classification Search
USPC .......................................................... 713/171
See application file for complete search history.

(56) References Cited

U.S. PATENT DOCUMENTS

| | | | | |
|---|---|---|---|---|
| 8,553,887 | B2* | 10/2013 | Hong | H04L 9/16 |
| | | | | 380/278 |
| 8,689,352 | B2* | 4/2014 | Schaad | H04L 9/3265 |
| | | | | 726/28 |
| 8,732,468 | B2* | 5/2014 | Roy | G06F 21/85 |
| | | | | 713/171 |
| 10,200,356 | B2* | 2/2019 | Okamura | H04L 9/32 |

OTHER PUBLICATIONS

Alkim et al: "Post-Quantum Key Exchange—A New Hope":International Association for Cryptologic Research, vol. 20151207:201623, Dec. 2015, pp. 1-33.

Deguchi et al: "Approximate Performance Bound for Coding in Secret Key Agreement From the Gaussian Channel"; 2015 IEEE Wireless Communications and Networking Conference (WCNC 2015)Mar. 2015, pp. 458-463.

Bos et al: "Frodo:Take Off the Ring! Practical, Quantum-Secure Key Exchange From LWE" International Association for Cryptologic Research, vol. 20160910:010217, Sep. 2016, pp. 1-26.

Ding: A Simple Provably Secure Key Exchange Scheme Based on the Learning With Errors Problem; Cryptology ePrint Archive, Report 2012/688, 2012, 13 Page Document.

Garcia-Morchon et al: "HIMMO: a Lightweight Collusion-Resistant Key Predistribution Scheme"; IACR Cryptology ePrint Archive, Report 2014/698, 2014, pp. 1-28.

Piekert: "Lattice Cryptography for the Internet"; Post Quantum Cryptography, Proceedings of the 6th Workshop on Post-Quantum Cryptography, PQ Crypto 2014, Springer LNCS, vol. 8772, 2014, pp. 197-219.

* cited by examiner

REACHING AGREEMENT ON A SECRET VALUE

CROSS-REFERENCE TO PRIOR APPLICATIONS

This application is the U.S. National Phase application under 35 U.S.C. § 371 of International Application No. PCT/EP2017/077843, filed on Oct. 31, 2017, which claims the benefit of European Patent Application No. 16197277.3, filed on Nov. 4, 2016. These applications are hereby incorporated by reference herein.

FIELD OF THE INVENTION

The invention relates to reaching agreement on a secret value. The invention in particular relates to two devices having already approximate agreement on a secret value, to reach exact agreement on the secret value.

BACKGROUND OF THE INVENTION

Many current applications make use of a key exchange protocol in which two parties A and B wish to generate a shared value. Such protocols may be related to the well-known Diffie-Hellman key-exchange protocol. In order to withstand cryptanalysis, the parties introduce some small errors in the computations in the protocol. As a result, parties A and B can obtain values, say $v_A$, $v_B$ that agree nearly, but not necessarily exactly. In order to arrive at exact agreement, one of the parties, say A, sends the other party, B, a bit value, say h, that is indicative of the secret value $v_A$ that is has computed. Party A also computes a value $s_A$ from the value $v_A$. Party B then computes a value $s_B$ from h and its own value $v_B$. The design of the system may be such that the secret values $s_A$ and $s_B$ are equal if the values $v_A$ and $v_B$ were sufficiently close to each other. An example of such a system is disclosed in J. Ding, X. Xie and X. Lin, "A simple provably secure key exchange scheme based on the learning with errors problem", Cryptology ePrint Archive, Report 2012/688, 2012, http://eprint.iacr.org/2012/688.pdf (referred to hereinafter as "Ding").

C. Peikert, "Lattice Cryptography for the Internet", Proceedings of the 6th Workshop on Post-Quantum Cryptography, PQ Crypto 2014, Springer LNCS, Vol. 8772, 2014, pp. 197-219 (hereinafter referred to as "Peikert"), discloses a method in which the generated secret shared values $s_a$ and $s_b$ are statistically unbiased, that is, are uniformly distributed. In Peikert's set-up, the secret value obtained by the two parties is one single bit.

Joppe Bos, Craig Costello, Léo Ducas, Ilya Mironov, Michael Naehrig, Valeria Nikolaenko, Ananth Raghunathan and Douglas Stebila, "Frodo: Take off the ring! Practical, Quantum-Secure Key Exchange from LWE", IACR Cryptology ePrint Archive, Report 2016/659, https://eprint.iacr.org/2016/659 (hereinafter referred to as "Bos" or "Frodo"), discloses an extension of Peikert's method so that the parties agree on a secret value that is uniformly distributed over a set of integers. In cited prior art methods, one single reconciliation bit is sent. In both Peikert's method and Bos' method, if the parties need to agree on many bits, the method is applied in parallel on multiple instances of reaching agreement. In all of the above references, exact key agreement can be achieved if the initially obtained values $v_A$, $v_B$ computed by the two parties do not differ too much.

SUMMARY OF THE INVENTION

It would be advantageous to have an improved way of reaching agreement between two devices on a secret value.

To better address this concern, a first aspect of the invention provides a second device, for reaching agreement on a secret value with a first device, comprising:

a receiver configured to receive information indicative of a reconciliation data h from the first device, wherein $0 \le h < 2^\delta$, wherein $\delta$ is an integer greater than 1; and a processor configured to compute a common secret s based on an integer value b and an equation $$s \equiv \left\lfloor \frac{b + c - h\frac{q}{2^{B+\delta}} - \frac{q}{2^{B+\delta+1}} + \frac{q}{2^{B+1}}}{\frac{q}{2^B}} \right\rfloor \mod 2^B,$$

wherein b satisfies $0 \le b < q$, B is a positive integer, and q is an integer multiple of $2^{B+\delta+1}$, wherein q, B, $\delta$, and c are system parameters.

Since the helper data is in the range of $0 \le h < 2^\delta$, wherein $\delta$ is an integer greater than 1, the helper data h that the first device sends to the second device consists of multiple bits. In this system, exact key agreement can be achieved even while imposing a less strict condition on the approximate agreement between the values a and b. The device set forth allows to determine the common secret s using the helper data h that the second device receives from the first device, so that exact agreement is achieved.

Specifically, exact agreement is achieved when the first device uses a number a in approximate agreement with the number b, in the sense that $a \equiv b + e \pmod{q}$, wherein e represents a difference between the numbers a and b, wherein the constraint $$|e| \le \frac{q}{2^{B+1}} - \frac{q}{2^{B+\delta+1}}$$

allows for a relatively large difference between a and b. This property allows the use of a more secure key exchange algorithm.

Alternatively, for a given approximate agreement condition, the system can be used to reach exact agreement on a secret value s that has at least one more bit than is the case in for example the prior art disclosed in Peikert or Bos.

In a particular example, the processor is configured to compute b based on a key exchange protocol. This key exchange protocol may be, for example, one of the key exchange protocols disclosed in Ding, Peikert, and Bos, or a variant thereof, which leads to an approximate agreement on a key. The device set forth allows to subsequently reach exact agreement in an efficient way, as outlined above.

In a particular example, $q = 2^m$ and $\delta = m - B - 1$, wherein m is a positive integer. This configuration allows agreement to be reached on multiple bits while using relatively few reconciliation bits.

In a particular example, the processor is configured to compute the value b based on a value $\beta$ and an equation $b \equiv w\beta \pmod{q}$, wherein $wN \equiv 1 \pmod{q}$, wherein N is an integer greater than 1 and is relatively prime to q. This allows to support a situation in which approximate agreement between the value $\alpha$ of the first device and the value $\beta$ of the second device is present according to a condition $\alpha \equiv \beta + Ne \pmod{q}$, wherein $$|e| \le \frac{q}{2^{B+1}} - \frac{q}{2^{B+\delta+1}}.$$

According to an other aspect of the invention, a first device for reaching agreement on a secret value with a second device is disclosed, wherein the first comprises:

a processor configured to:

determine a common secret s based on an integer value a and an equation $$s = \left\lfloor \frac{(a+c) \bmod q}{\frac{q}{2^B}} \right\rfloor,$$

wherein a satisfies $0 \leq a < q$, B is a positive integer, q is an integer multiple of $2^{B+\delta+1}$, wherein $\delta$ is an integer greater than 1, wherein q, B, $\delta$, and c are system parameters, and determine a reconciliation data h based on an equation $$h = \left\lfloor \frac{((a+c) \bmod q) \bmod \left(\frac{q}{2^B}\right)}{\frac{q}{2^{B+\delta}}} \right\rfloor;$$

and a transmitter configured to transmit information indicative of the reconciliation data h to the second device.

Since the helper data h is in the range of $0 \leq h < 2^\delta$, wherein $\delta$ is an integer greater than 1, the helper data h that the first device sends to the second device consists of multiple bits. In this system, exact key agreement can be achieved even while imposing a less strict condition on the approximate agreement between the values a and b of the first device and the second device. The device set forth allows to generate and transmit the helper data h that the second device needs to determine the common secret s, so that exact agreement is achieved.

Specifically, exact agreement is achieved when the first device uses a number a in approximate agreement with the number b, in the sense that $a \equiv b+e \pmod{q}$, wherein e represents a difference between the numbers a and b, wherein the constraint $$|e| \leq \frac{q}{2^{B+1}} - \frac{q}{2^{B+\delta+1}}$$

allows for a relatively large difference between a and b. This property allows the use of a more secure key exchange algorithm.

Alternatively, for a given approximate agreement condition, the system can be used to reach exact agreement on a secret value s that has at least one more bit than is the case in for example the prior art disclosed in Peikert or Bos.

In a particular example, the processor is configured to compute a based on a key exchange protocol. This key exchange protocol may be, for example, one of the key exchange protocols disclosed in Ding, Peikert, and Bos, or a variant thereof, which leads to an approximate agreement on a key.

In a particular example, $q = 2^m$, wherein m is a positive integer, the common secret s corresponds to B most significant bits of a binary expansion of $(a+c) \bmod 2^m$, and the reconciliation data h corresponds to next $\delta$ bits of the binary expansion. This is a particularly appealing representation of the data components that together form a. In an even more specific example, $\delta = m - B - 1$. This value allows to reconcile multiple bits at once, while using relatively few bits for the helper data h. For example, this value of $\delta$ allows to reconcile one more bit than with the method disclosed in Bos, under same approximate agreement conditions.

In a particular example, $c = 0$. In that case, the common secret s equals a quotient of a and $$\left(\frac{q}{2^B}\right),$$

rounded downwards to the closest integer.

In a particular example, $$c = \frac{q}{2^{B+1}}.$$

In that case, the common secret s equals a quotient of a and $$\left(\frac{q}{2^B}\right),$$

rounded to the closest integer, wherein rounding is performed upwards in case of a tie.

In a particular example, $$c = \frac{q}{2^{B+1}} - 1.$$

In that case, the common secret s equals a quotient of a and $$\left(\frac{q}{2^B}\right),$$

rounded to the closest integer, wherein rounding is performed downwards in case of a tie.

In a particular example, the processor is configured to compute the value a based on a value $\alpha$ and an equation $a \equiv w\alpha \pmod{q}$, wherein $wN \equiv 1 \pmod{q}$, wherein N is an integer greater than 1, wherein N is relatively prime to q. This allows to support a situation in which approximate agreement between the value $\alpha$ of the first device and the value $\beta$ of the second device is present according to a condition $\alpha \equiv \beta + Ne \pmod{q}$, wherein $$|e| \leq \frac{q}{2^{B+1}} - \frac{q}{2^{B+\delta+1}}.$$

According to another aspect of the invention, a system is presented that comprises the first device and the second device set forth hereinabove, wherein the number a is in approximate agreement with the number b, in the sense that $a \equiv b+e \pmod{q}$, wherein e represents a difference between the numbers a and b, wherein $$|e| \leq \frac{q}{2^{B+1}} - \frac{q}{2^{B+\delta+1}}.$$

This enables the two devices, who have approximate agreement about values a and b, to reach exact agreement on a common secret s, by transmitting the reconciliation data h from the first device to the second device.

According to another aspect of the invention, a method is to be performed by a second device for reaching agreement on a secret value with a first device, wherein the method comprising:

receiving information indicative of a reconciliation data h from the first device, wherein $0 \leq h < 2^\delta$, wherein $\delta$ is an integer greater than 1; and computing a common secret s based on an integer value b and an equation $$s \equiv \left\lfloor \frac{b + c - h\frac{q}{2^{B+\delta}} - \frac{q}{2^{B+\delta+1}} + \frac{q}{2^{B+1}}}{\frac{q}{2^B}} \right\rfloor \bmod 2^B,$$

wherein b satisfies $0 \leq b < q$, B is a positive integer, and q is an integer multiple of $2^{B+\delta+1}$, wherein q, B, $\delta$, and c are system parameters.

According to another aspect of the invention, a method is to be performed by a first device for reaching agreement on a secret value with a second device, wherein the method comprises:

determining a common secret s based on an integer value a and an equation $$s = \left\lfloor \frac{(a+c) \bmod q}{\frac{q}{2^B}} \right\rfloor,$$

wherein a satisfies $0 \leq a < q$, B is a positive integer, q is an integer multiple of $2^{B+\delta+1}$, wherein $\delta$ is an integer greater than 1, wherein q, B, $\delta$, and c are system parameters;

determining a reconciliation data h based on an equation $$h = \left\lfloor \frac{((a+c) \bmod q) \bmod \left(\frac{q}{2^B}\right)}{\frac{q}{2^{B+\delta}}} \right\rfloor;$$

and transmitting information indicative of the reconciliation data h to the second device.

It will be appreciated by those skilled in the art that two or more of the above-mentioned embodiments, implementations, and/or aspects of the invention may be combined in any way deemed useful. Modifications and variations of the methods, which correspond to the described modifications and variations of the devices, can be carried out by a person skilled in the art on the basis of the present description.

BRIEF DESCRIPTION OF THE DRAWINGS

These and other aspects of the present invention will be discussed in more detail below, with reference to the attached drawings.

DETAILED DESCRIPTION OF THE EMBODIMENTS

Figure 1:
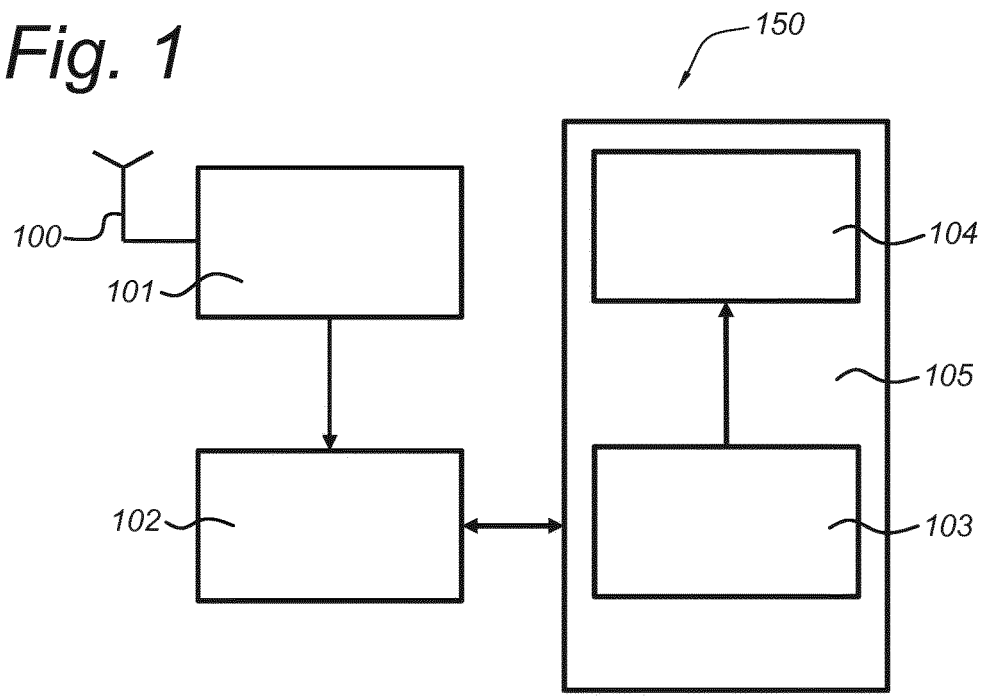
FIG. 1 shows a block diagram of a second device for reaching agreement on a secret value with a first device.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope of the invention. In addition, descriptions of well-known functions and constructions may be omitted for clarity and conciseness.

The following notation will be used in this disclosure: For any two integers x and v, with $v \geq 2$, then $\langle S \rangle_v$ denotes the integer satisfying $$0 \leq \langle x \rangle_v \leq v-1 \text{ and } \langle x \rangle_v \equiv x \bmod v.$$

Moreover, for any real number y, the notation $\lfloor y \rfloor$ denotes the result of rounding y downwards to the closest integer, and the notation $\lceil y \rceil$ denotes the result of rounding y upwards to the closest integer. For example:

$$\left\lfloor \frac{9}{2} \right\rfloor = 4, \left\lceil \frac{9}{2} \right\rceil = 5,$$

and $\lfloor 4 \rfloor = \lceil 4 \rceil = 4$.

In certain embodiments, two parties, A and B, are using a particular protocol in which party A computes a number a and party B computes a number b. The protocol should be such that, because of the way in which a and b have been computed, they approximately agree. This approximate agreement is expressed in terms of system constants q, B and $\delta$, which are known to A and B, where q, $\delta$ and B are positive integers, and q is an integer multiple of $2^{B+\delta+1}$, as follows: a and b both are integers in the interval [0, q) and satisfy $$a \equiv b + e \pmod{q} \quad \text{(equation 1)}$$

wherein $$|e| \leq \frac{q}{2^{B+1}} - \frac{q}{2^{B+\delta+1}}. \quad \text{(equation 2)}$$

Using the present disclosure, the two parties can arrive at a common B-bits secret S by having one party, say party A, transmit $\delta$ bits of reconciliation data to party B. One more integer system parameter c; its relevance will be disclosed hereinafter. Integers h and v are defined by the following equation:

$$\langle a + c \rangle_q = s\frac{q}{2^B} + h\frac{q}{2^{B+\delta}} + v, \quad \text{(equation 3)}$$

wherein $$0 \leq h\frac{q}{2^{B+\delta}} + v \leq \frac{q}{2^B} - 1 \text{ and } 0 \leq v \leq \frac{q}{2^{B+\delta}} - 1.$$

In particular, $$s = \left\lfloor \frac{\langle a+c \rangle_q}{(q/2^B)} \right\rfloor. \quad \text{(equation 4)}$$

In the special case that $q=2^m$, the secret value S corresponds to the B most significant bits of the binary expansion of $\langle a+c \rangle_{2^m}$, h corresponds to the next significant $\delta$ bits of the binary expansion of $\langle a+c \rangle_{2^m}$, and v corresponds to the m−B−$\delta$ least significant bits of $\langle a+c \rangle_{2^m}$.

By considering equation (1) modulo $$\frac{q}{2^B},$$

it follows that $$b + c - h\frac{q}{2^{B+\delta}} \equiv v - e \left( \mod \frac{q}{2^B} \right). \quad \text{(equation 5)}$$

As $$0 \leq v \leq \frac{q}{2^{B+\delta}} - 1$$

and as equation (2) is satisfied, it follows that $$0 \leq v - e - \frac{q}{2^{B+\delta+1}} + \frac{q}{2^{B+1}} \leq \frac{q}{2^B} - 1. \quad \text{(equation 6)}$$

By combining equation (5) and equation (6), it follows that $$v - e - \frac{q}{2^{B+\delta+1}} + \frac{q}{2^{B+1}} = \left\langle b + c - h\frac{q}{2^{B+\delta}} - \frac{q}{2^{B+\delta+1}} + \frac{q}{2^{B+1}} \right\rangle_{q/2^B}. \quad \text{(equation 7)}$$

By combining equation (1) and equation (3), it follows that $$s\frac{q}{2^B} \equiv b + c - h\frac{q}{2^{B+\delta}} - (v - e) (\mod q), \quad \text{(equation 8)}$$

and from equation (8) it follows that $$s \equiv \frac{b + c - h\frac{q}{2^{B+\delta}} - (v - e)}{q/2^B} (\mod 2^B). \quad \text{(equation 9)}$$

By combining equation (9) and equation (7), and using the property $S \in [0, 2^B)$, it follows that party B can compute s using the equation $$s = \left\langle \left\lfloor \frac{b + c - h\frac{q}{2^{B+\delta}} - \frac{q}{2^{B+\delta+1}} + \frac{q}{2^{B+1}}}{q/2^B} \right\rfloor \right\rangle_{2^B}. \quad \text{(equation 10)}$$

By simplifying equation (10), it follows that party B can alternatively compute S using the equation $$s = \left\langle \left\lfloor \frac{b+c}{q/2^B} - \frac{h}{2^\delta} - \frac{1}{2^{\delta+1}} + \frac{1}{2} \right\rfloor \right\rangle_{2^B}. \quad \text{(equation 11)}$$

Equations (10) and (11) show that S can be computed from b, h and the system parameters q, B and $\delta$. So if party A sends information indicative of h to party B, then party B can retrieve S, which can be used as a common secret between party A and party B.

Since equation (3) implies $$0 \leq h\frac{q}{2^{B+\delta}} < \frac{q}{2^B},$$

it follows that $0 \leq h < 2^\delta$, so h can be represented by $\delta$ bits.

It is observed that if c=0, Equation (4) states that the secret S equals the quotient of a and $(q/2^B)$, rounded downwards to the closest integer. With the choice $c=q/2^{B+1}$, the secret S equals the quotient of a and $q/2^B$, rounded to the closest integer (modulo $2^B$) (and rounded upwards in case of a tie, that is, if a equals $$k\frac{q}{2^B} + \frac{q}{2^{B+1}}$$

for some integer k). With the choice $c=q/(2^{B+1})-1$, the secret S equals the quotient of a and $q/2^B$, rounded to the closest integer modulo $2^B$, with rounding downwards in case of a tie. Other values of c may be used to obtain another result, as desired. For these special choices for c, the computation of S by party B can be simplified. Indeed, party B can obtain S using the equation $$s = \left\langle 1 + \left\lfloor \frac{b}{q/2^B} - \frac{h}{2^\delta} - \frac{1}{2^{\delta+1}} \right\rfloor \right\rangle_{2^B} \text{ if } c = \frac{q}{2^{B+1}}, \quad \text{(equation 12)}$$

and as $$s = \left\langle 1 + \left\lfloor \frac{b-1}{q/2^B} - \frac{h}{2^\delta} - \frac{1}{2^{\delta+1}} \right\rfloor \right\rangle_{2^B} = \quad \text{(equation 13)}$$

$$\left\langle \left\lfloor \frac{b}{q/2^B} - \frac{h}{2^\delta} - \frac{1}{2^{\delta+1}} \right\rfloor \right\rangle_{2^B}$$

if $c = \frac{q}{2^{B+1}} - 1$.

In case that $q=2^m$, the common secret S may consist of the B most significant bits of a; the helper data h consists of the subsequent δ bits of a. Moreover, if a is uniformly distributed, then the common secret S given the helper data h is uniformly distributed as well. That is, an adversary cannot obtain information on the common secret S from the observation of the helper data h.

It is noted that the "approximate agreement" condition can be generalized. For example, it is possible to replace equation (1) by the condition:

$$a \equiv b + Ne \pmod{q} \quad \text{(equation 14)}$$

for some integer N that is relatively prime to q, that is, the greatest common divisor of N and q is one. The condition on the absolute value of e as specified in equation (2) may be kept the same:

$$|e| \leq \frac{q}{2^{B+1}} - \frac{q}{2^{B+\delta+1}}. \quad \text{(equation 2)}$$

For example, if $q=2^m$ for some integer m, then N can be any odd number. In such a case, the computation of the secret and the helper data can be performed using the following derivation. Let W be an integer such that $wN \equiv 1 \pmod{q}$. Such an integer exists, because q and N are relatively prime. Let $\alpha := \langle wa \rangle_q$ and $\beta := \langle wb \rangle_q$. Then $\alpha \equiv \beta + e \pmod{q}$. Thus, the parties can agree on a secret $$s = \left\lfloor \frac{\alpha + c}{(q/2^B)} \right\rfloor$$

as explained before, using α and β instead of a and b, respectively.

For $\delta=1$ and $q=2^m$, and obtaining the secret s as the integer closest to the quotient of a and $2^{m-B}$, one reconciliation bit h is sent, and the parties can agree on a B-bits secret s whenever, for example, $|e| \leq 2^{m-B-2}$. If and $\delta=B-1$, the parties can agree on a B-bits secret s whenever $|e| \leq 2^{m-B-1}-1$. By increasing the number of reconciliation bits, the parties thus can agree on a secret value that is one bit longer.

Using the techniques described herein, it is possible to reach agreement about the secret without exchange of information about the $m-B-\delta \geq 1$ least significant bits of a. By varying δ, it is possible to achieve a trade-off between bandwidth requirements for sending reconciliation data and the approximation requirements for successful exact agreement.

FIG. 1 shows a bock diagram of an example of a second device 150 for reaching agreement on a secret value with a first device 250. The second device 150 comprises an antenna 100, a receiver 101, a processor 102, and a memory 105. The antenna 100 is connected to the receiver 101 for receiving a signal. In operation, the memory 105 comprises a data block 103 and a computing block 104. The antenna 100 may be used for sending and/or receiving signals wirelessly using an appropriate communications standard. In an alternative implementation, antenna 100 may be replaced by a wired (network) connection. Although in the present disclosure, only a receiver 102 is needed, practical implementations may also comprise a transmitter for transmitting signals, for example using the antenna 100. The processor 102 controls operation of the device, including the receiver 101 and the memory. The data block 103 of the memory 105 may be used to store various data, including but not limited to system parameters (e.g. q, B, δ, and c), a secret s, received reconciliation data h, a value b, and other data such as contents to be encrypted or decrypted. The computing block 104 may comprise executable computer code that implements at least a method to reach agreement on a secret value with another device (for example first device 250).

The receiver 101 is configured to receive information indicative of a reconciliation data h from the first device, wherein $0 \leq h < 2^\delta$, wherein δ is an integer greater than 1. The processor 102 is configured to compute a common secret s based on the integer value b and an equation $$s \equiv \left\lfloor \frac{b + c - h\frac{q}{2^{B+\delta}} - \frac{q}{2^{B+\delta+1}} + \frac{q}{2^{B+1}}}{\frac{q}{2^B}} \right\rfloor \mod 2^B.$$

For example, s can be chosen to be the value for which the above equation holds and wherein $0 \leq s < 2^B$.

The value b satisfies $0 \leq b < q$, system parameter B is a positive integer, and system parameter q is an integer multiple of $2^{B+\delta+1}$. These system parameters may be pre-programmed in the device, or be received from a trusted party, for example. These system parameters are not necessarily kept secret.

The processor 102 may be configured to compute b before computing the common secret s. Such a computation may be based on a key exchange protocol. To that end, the second device 150 may exchange further information with the first device 250 or another device, such as a third party intermediary (not shown), via its receiver 102 or optional transmitter, in accordance with the key exchange protocol. The details of this key exchange protocol are beyond the scope of the present disclosure. It is a property of the second device that it can determine the common secret s using the reconciliation data h, if the first device 250 has computed the reconciliation data h as disclosed hereinafter with reference to FIG. 2, as long as the first device 250 uses a number a in approximate agreement with the number b, in the sense that $a \equiv b + e \pmod{q}$, wherein e represents a difference between the numbers a and b, wherein $$|e| \leq \frac{q}{2^{B+1}} - \frac{q}{2^{B+\delta+1}}.$$

For specific values of c, the computation of the common secret s can be simplified (see also equations 12 and 13). The processor 102 of the second device can be configured to compute s by evaluating a formula $$s = \left\langle 1 + \left\lfloor \frac{b - \frac{h}{2^{B+\delta}} - \frac{q}{2^{B+\delta+1}}}{\frac{q}{2^B}} \right\rfloor \right\rangle_{2^B} \text{ if } c = \frac{q}{2^{B+1}}$$

Also, processor 102 of the second device can be configured to compute s by evaluating a formula $$s = \left\langle 1 + \left\lfloor \frac{b - \frac{h}{2^{B+\delta}} - \frac{q}{2^{B+\delta+1}} - 1}{\frac{q}{2^B}} \right\rfloor \right\rangle_{2^B} \text{ if } c = \frac{q}{2^{B+1}} - 1$$

which can be implemented alternatively as $$s = \left\lfloor \frac{\left|b - \frac{h}{2^{B+\delta}} - \frac{q}{2^{B+\delta+1}}\right|}{\frac{q}{2^B}} \right\rfloor_{2^B} \text{ if } c = \frac{q}{2^{B+1}} - 1.$$

In a particular example, $q=2^m$ and $\delta=m-B-1$, wherein m is a positive integer. Herein, $>B+3$.

In another example, the processor 102 is configured to compute the value b based on a value β and an equation b≡wβ (mod q), wherein wN≡1 (mod q), wherein N is an integer greater than 1 and is relatively prime to q. This allows to support a larger difference between a and b, such as explained hereinabove with respect to equation 14.

Figure 2:
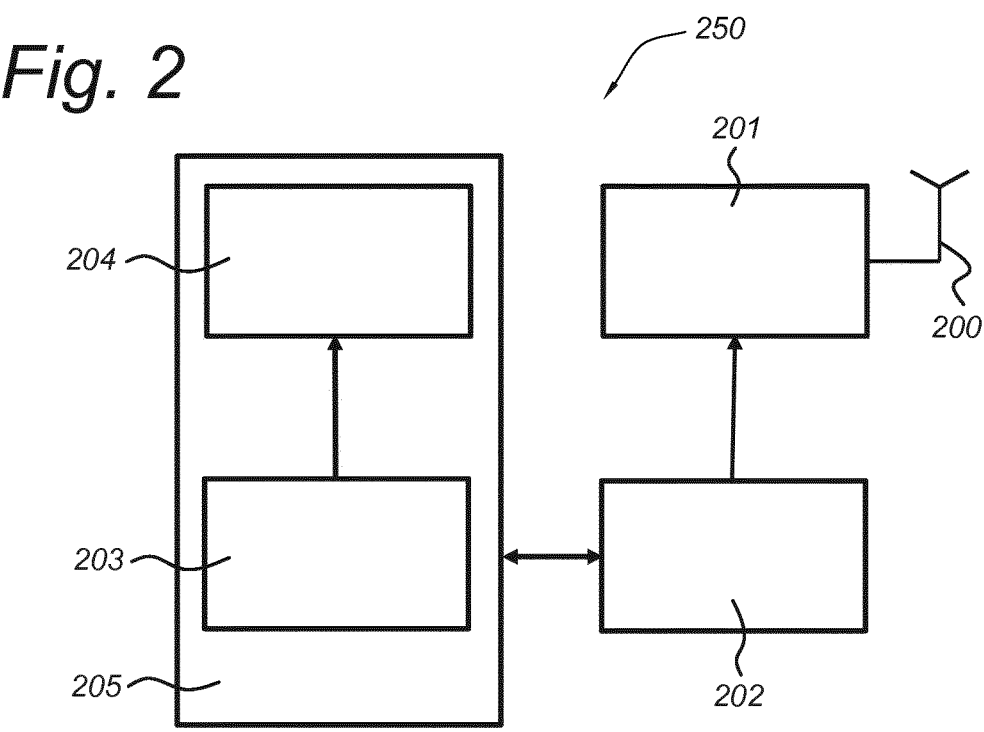
FIG. 2 shows a block diagram of a first device for reaching agreement on a secret value with a second device.

FIG. 2 shows a bock diagram illustrating an example of a first device 250 for reaching agreement on a secret value with a second device 150. The first device 250 comprises an antenna 200, a transmitter 201, a processor 202, and a memory 205. The antenna 200 is connected to the transmitter 201 for receiving a signal. In operation, the memory 205 comprises a data block 203 and a computing block 204. The antenna 200 may be used for sending and/or receiving signals wirelessly using an appropriate communications standard. In an alternative implementation, antenna 200 may be replaced by a wired (network) connection. Although for description of the present disclosure, only a transmitter 202 is needed, practical implementations may also comprise a receiver for receiving signals, for example using the antenna 200. The processor 202 controls operation of the device, including the transmitter 201 and the memory 205. The data block 203 of the memory 205 may be used to store various data, including but not limited to system parameters (e.g. q, B, δ, and c), a secret s, reconciliation data h, a value b, and other data such as contents to be encrypted or decrypted. The computing block 204 may comprise executable computer code that implements at least a method to reach agreement on a secret value with another device (for example second device 150).

In a practical implementation, the processor 202 may be configured to determine a common secret s based on an integer value a and an equation $$s = \left\lfloor \frac{(a+c) \bmod q}{\frac{q}{2^B}} \right\rfloor$$

This may be alternatively written as:

$$s = \left\lfloor \frac{\langle a+c \rangle_q}{\frac{q}{2^B}} \right\rfloor$$

wherein the value a satisfies 0≤a<q, system parameter B is a positive integer, system parameter q is an integer multiple of $2^{B+\delta+1}$, and system parameter δ is an integer greater than 1.

Before or after determining the common secret s (or simultaneously), the processor 202 may determine a reconciliation data h based on an equation $$h = \left\lfloor \frac{((a+c) \bmod q) \bmod \left(\frac{q}{2^B}\right)}{\frac{q}{2^{B+\delta}}} \right\rfloor$$

This may be alternatively written as:

$$h = \left\lfloor \frac{\langle \langle a+c \rangle_q \rangle_{\frac{q}{2^B}}}{\frac{q}{2^{B+\delta}}} \right\rfloor$$

The transmitter 201 may be configured to transmit, under control of the processor 202, information indicative of the reconciliation data h to the second device. For example, the information indicative of the reconciliation data h can be a binary representation of the reconciliation data h or an encoded representation of the reconciliation data h.

In a particular example, the processor 202 is configured to compute a based on a key exchange protocol. To that end, the first device 250 may exchange further information with the second device 150, or another device, such as a third party intermediary (not shown), in accordance with the key exchange protocol, using transmitter 201 or an optional receiver. The details of this key exchange protocol are beyond the scope of the present disclosure. It is a property of the first device 250 that it can provide the second device 150 with the additional reconciliation data h. The second device 150 can determine the common secret s using the reconciliation data h, by combining the reconciliation data h with the number b in a way as described herein with reference to FIG. 1, as long as the first device 250 uses a number a in approximate agreement with the number b that is used by the second device 150, in the sense that a≡b+e (mod q), wherein e represents a difference between the numbers a and b, wherein $$|e| \leq \frac{q}{2^{B+1}} - \frac{q}{2^{B+\delta+1}}.$$

In a particular implementation example, $q=2^m$, wherein m is a positive integer, the common secret s corresponds to B most significant bits of a binary expansion of (a+c) mod $2^m$, and the reconciliation data h corresponds to next most significant δ bits of the binary expansion of (a+c) mod $2^m$. For example, δ=m−B−1 may provide a relatively large number of bits that can be reconciled while allowing a relatively relaxed constraint regarding how approximate the agreement between a and b should be, and transmitting relatively few bits of reconciliation data δ. However, this value is only presented as an example.

The secret s can be derived from the value a in several different ways. For example, different behavior can be realized by varying the system parameter c. The same value of the system parameters (including c) should be used in both the first device and the second device for optimal performance. For example, c=0 can be chosen so that the common secret s equals a quotient of a and $$\left(\frac{q}{2^B}\right),$$

rounded downwards to the closest integer. Alternatively, $$c = \frac{q}{2^{B+1}}$$

may be chosen, so that the common secret s equals a quotient of a and $$\left(\frac{q}{2^B}\right),$$

rounded to the closest integer, wherein rounding is performed upwards in case of a tie. Yet alternatively, $$c = \frac{q}{2^{B+1}} - 1$$

is chosen, so that the common secret s equals a quotient of a and $$\left(\frac{q}{2^B}\right),$$

rounded to the closest integer, wherein rounding is performed downwards in case of a tie.

In a particular implementation example, the processor is configured to compute the value a based on a value α and an equation a≡wα (mod q), wherein wN≡1 (mod q), wherein N is an integer greater than 1, wherein N is relatively prime to q. This allows to support a larger difference between a and b, such as explained hereinabove with respect to equation 14.

The processors 102 and 202 can be any type of computer processor, capable of executing a program stored in memory and controlling peripherals such as a transmitter, receiver, memory, and the like. For example, the processor 102 or 202 can be a microcontroller or a microprocessor. Such a processor is an electronic device that is well known in the art. Also, the processor 102, 202 may comprise a plurality of sub-processors that can cooperate to perform certain tasks in parallel. The memory 105 or 205 can be any type of memory that is capable of storing digital data, either in volatile or non-volatile manner. The memory 105 or 205 is computer readable, and can be used by the respective processor 102, 202 to retrieve and/or store data. Such memory 105, 205 is an electronic device. Well known examples include a Flash memory, a random access (RAM) memory, read-only memory (ROM) and a magnetic or optical drive. A combination of these types of memory may be used in each device.

In a particular example, one device contains all the components and functionality of both the first device and the second device. For example, the device can switch roles between the role of the first device and the second device.

The data transmission from the first device to the second device may be by means of direct communication. Alternatively, the transmission may be performed via a network, and the reconciliation data may pass several nodes on the network before reaching the second device. For example, the data transmission can use Wi-Fi, Bluetooth, 3G, 4G, LTE data network technology.

Figure 3:
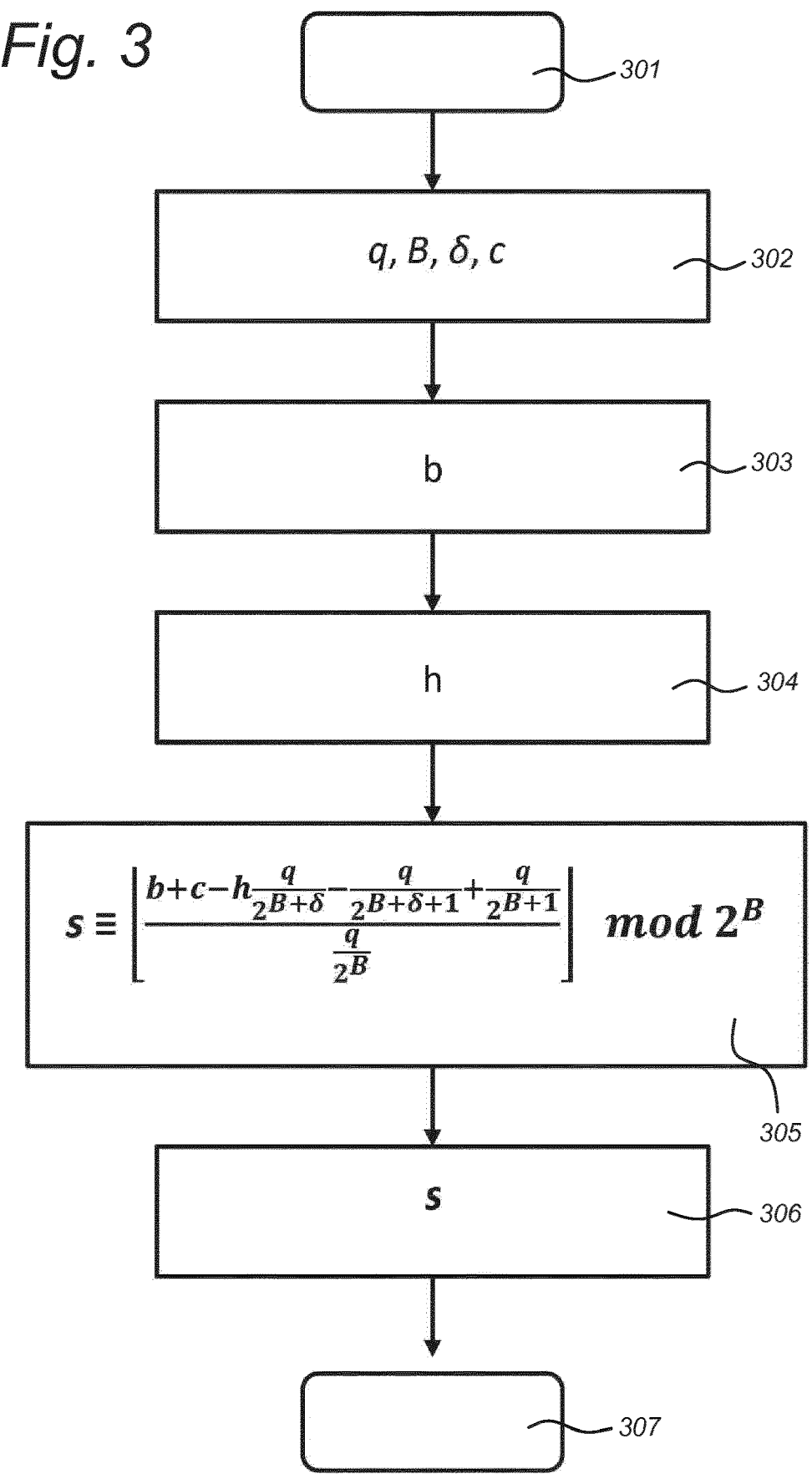
FIG. 3 shows a flowchart of a method performed by a second device for reaching agreement on a secret value with a first device.
Figure 4:
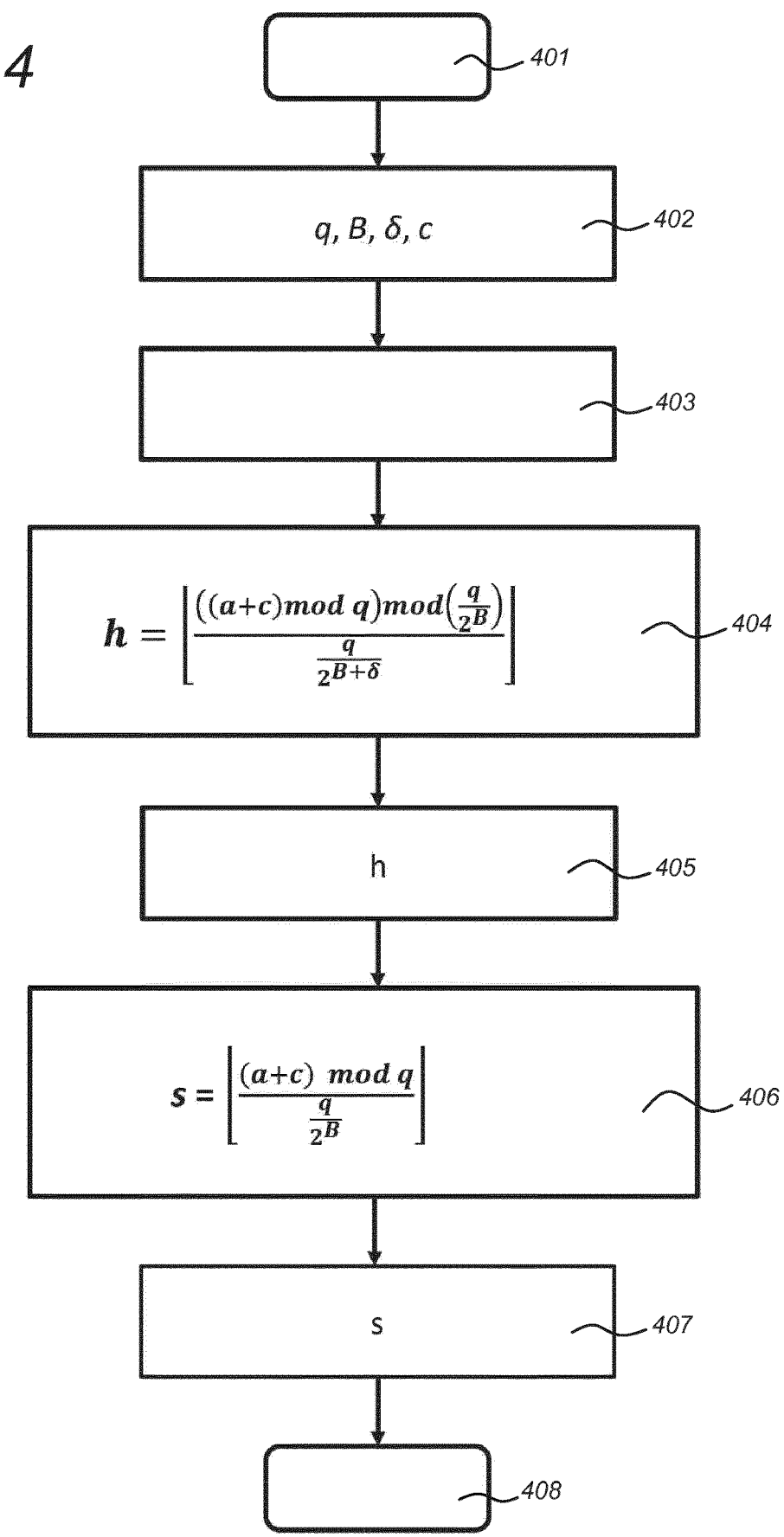
FIG. 4 shows a flowchart of a method performed by a first device for reaching agreement on a secret value with a second device.
Figure 5:
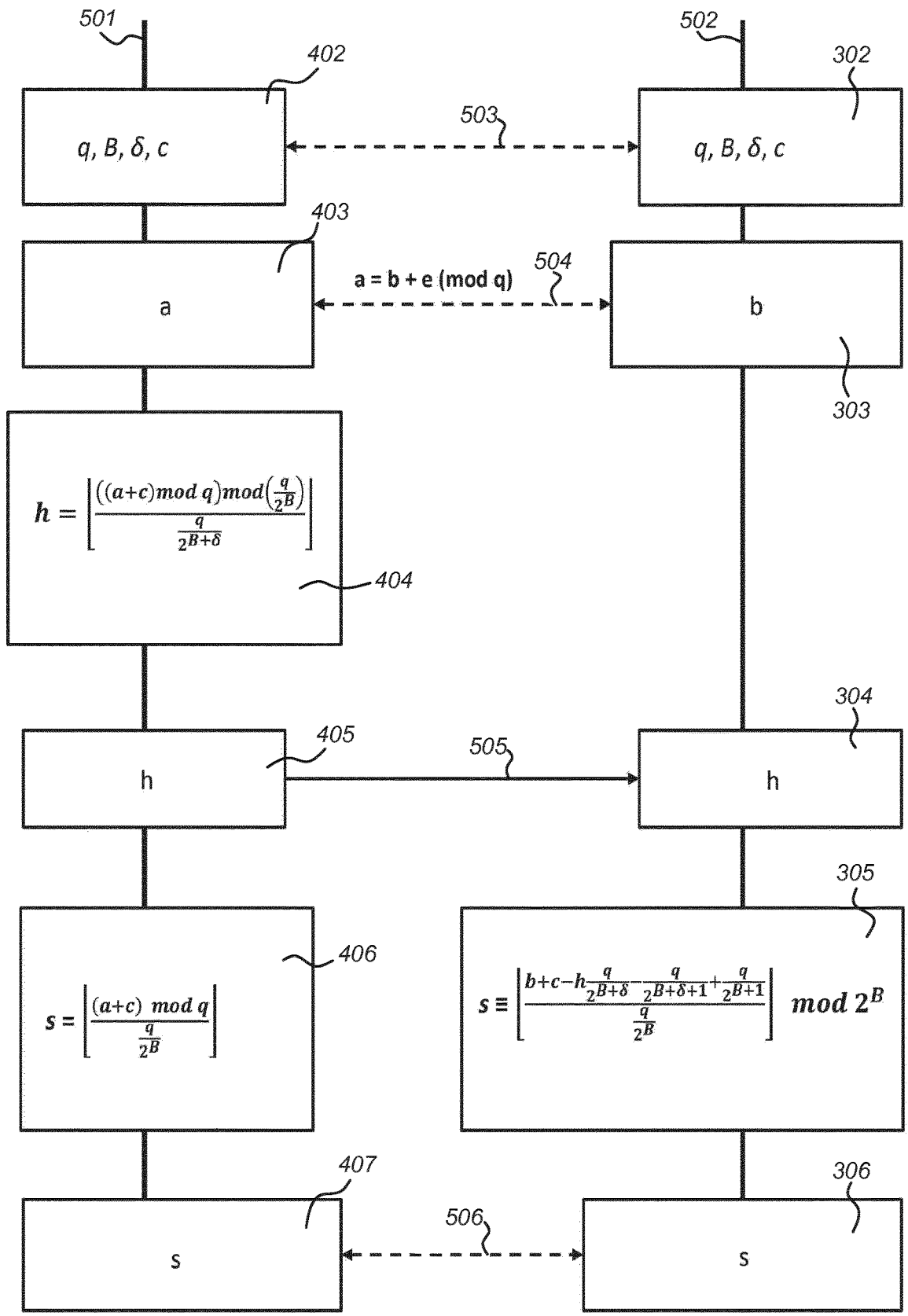
FIG. 5 shows a time diagram of a system comprising a first device and a second device for reaching agreement on a secret value.

FIG. 3 illustrates a method to be performed by a second device for reaching agreement on a secret value with a first device. FIG. 4 illustrates a method to be performed by the first device for reaching agreement on a secret value with the second device. FIG. 5 illustrates how the first device 501 and the second device 502 can cooperate to reach agreement. The steps illustrated in FIG. 5 that correspond to the steps illustrated in FIG. 3 and FIG. 4 have been indicated using the same reference numerals.

Referring to FIG. 3 and FIG. 5, the second device starts the method at step 301. The start may be triggered by an appropriate internal or external signal, or an input provided by a user, for example. For example, the method starts when a first device tries to set up communication with the second device. In step 302, the system parameters parameters q, B, δ, and c are determined. For example, these system parameters are retrieved from the memory 103. Optionally, as indicated by arrow 503, this step can involve negotiating between the first and second device about the system parameters to be used; for example, messages can be exchanged about a set of parameters that is supported by both devices. B is a positive integer, δ is an integer greater than 1, and q is an integer multiple of $2^{B+\delta+1}$. In step 303, the number b is determined. For example, this number is computed from data that is made available to the second device. Alternatively, the number b is received from an external source, for example a trusted party, preferably in an encrypted form. The number b could be obtained as part of a lattice-based key exchange protocol. As indicated by arrow 504, the value b is in approximate agreement with a corresponding value a of the first device 501. In step 304, the second device receives the information indicative of the reconciliation data h, as indicated by arrow 505. The information may be transmitted to the second device in an encrypted form, and be decrypted by the second device, for example. The reconciliation data is in the range of $0 \le h < 2^\delta$. In step 305, the second device computes s based on an equation $$s \equiv \left\lfloor \frac{b + c - h\frac{q}{2^{B+\delta}} - \frac{q}{2^{B+\delta+1}} + \frac{q}{2^{B+1}}}{\frac{q}{2^B}} \right\rfloor \mod 2^B$$

For example, $$s = \left(\left\lfloor \frac{b + c - h\frac{q}{2^{B+\delta}} - \frac{q}{2^{B+\delta+1}} + \frac{q}{2^{B+1}}}{\frac{q}{2^B}} \right\rfloor\right)_{2^B}$$

Other representations of s are also possible.

In step 306, optionally a key is determined based on the common secret s.

Then, the method is ended in step 307. Optionally, the second device can now start using the common secret s and/or the key based on the common secret s. The possible uses can by any one or more of many, including cryptographic processing of data, such as content, e.g. encryption, decryption, digital signature creation and verification. For example, the common secret s can be used for secure exchange of messages between the first device and the second device, as indicated by arrow 506. Also, the common secret s and/or the key derived therefrom can be stored in the memory of the second device for later use.

Referring to FIG. 4 and FIG. 5, the first device starts the method at step 401. The start may be triggered by an appropriate internal or external signal, or an input provided by a user, for example. For example, the method starts when a second device tries to set up communication with the first device. In step 402, the system parameters q, B, δ, and c are determined. For example, these system parameters are retrieved from memory. Optionally, as indicated by arrow 503, this step can involve negotiating between the first and second device about the system parameters to be used; for example, messages can be exchanged to determine a set of parameters that is supported by both devices. B is a positive integer, δ is an integer greater than 1, and q is an integer multiple of $2^{B+\delta+1}$. In step 403, the first device determines a number a. This determination may be based on a key exchange protocol, for example. For example, this number a is computed from data that is made available to the first device. Alternatively, the number a is received from an external source, for example a trusted party, preferably in an encrypted form. The number a could be obtained as part of a lattice-based key exchange protocol. As indicated by arrow 504, the value a is in approximate agreement with a corresponding value b of the second device 502. In step 404, the first device determines a reconciliation data h. This reconciliation data may be based on the equation $$h = \left\lfloor \frac{((a+c) \bmod q) \bmod \left(\frac{q}{2^B}\right)}{\frac{q}{2^{B+\delta}}} \right\rfloor$$

The reconciliation data can be in the range of $0 \leq h < 2^\delta$. In step 405, the first device transmits information indicative of the reconciliation data h, as indicated by arrow 505, to the second device. The information may be encrypted by the first device to transmit the information to the second device in an encrypted form, for example. In step 406, the first device determines the common secret s. This step may be performed before the other steps. In an alternative implementation, the common secret s may be determined before determining the number a, wherein the first device may derive the number a from the common secret s. The common secret s may be computed based on an equation $$s = \left\lfloor \frac{(a+c) \bmod q}{\frac{q}{2^B}} \right\rfloor$$

In other notation, $$s = \left\lfloor \frac{\langle a+c \rangle_q}{\frac{q}{2^B}} \right\rfloor$$

Other representations of s are also possible. In step 407, optionally a key is determined based on the common secret s. Alternatively, the common secret s may be based on a key determined beforehand. Then, the method is ended in step 408. Optionally, the first device can use the common secret s and/or the key. The possible uses can by any one or more of many, including cryptographic processing of data, such as content, e.g. encryption, decryption, digital signature creation and verification. For example, the common secret s or the key can be used for secure exchange of messages between the first device and the second device, as indicated by arrow 506. Also, the common secret s and/or the key can be stored in the memory of the second device for later use.

Figure 6:
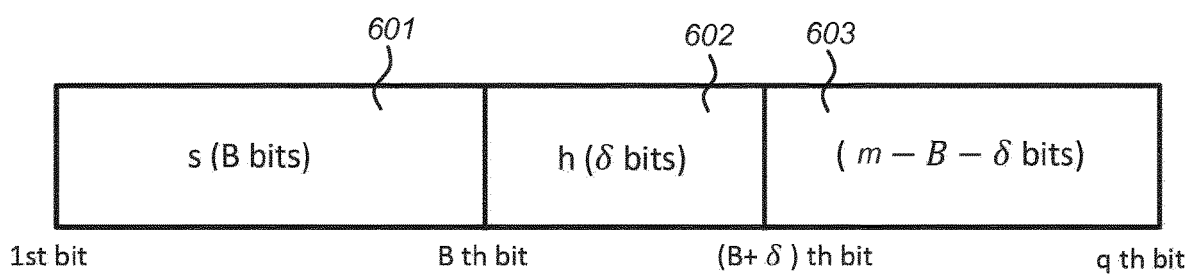
FIG. 6 shows a bit length description of an identifier used in the system.

FIG. 6 shows an example illustrating conceptually a possible relationship between a, s, h, m, B, and q for the specific case of $q=2^m$ and $c=0$. In the drawing, the binary representation of a is illustrated, from the most significant bit (on the left-hand side) to the most significant bit (on the right-hand side). At numeral 601, it is illustrated that the common secret s is represented by the B most significant bits of a. At numeral 602, it is illustrated that the reconciliation data h is represented by the (B+1)th to (B+δ)th most significant bits of a. At numeral 603, it is illustrated that the remaining (B+δ+1)th to q-th bits, i.e. the m−B−δ least significant bits of a, are not represented in either the common secret s nor the reconciliation data h. This feature may allow data savings regarding the number of bits of the reconciliation data h and/or increased tolerance regarding the approximate agreement between a and b.

In this disclosure, a reconciliation method is presented that can send more than one reconciliation bit. The techniques disclosed herein may be used, for example, to cause parties to agree on a particular number of bits, while imposing less stringent conditions on "how approximate" the approximate agreement should be. Allowing for less stringent conditions on the approximate agreement can improve the security of the system. Alternatively, with about the same approximation conditions (i.e., with similar security guarantees), an instance of the method allows the two parties to agree on a secret value that is one bit longer. Hereinafter, some of the advantages of the method and its impact are disclosed by means of numerical examples.

Bos discloses a quantum-secure key exchange method. One party sends to another party a small seed and an $n \times \bar{n}$ matrix with elements from $Z_q$. In response, an $\bar{m} \times n$ matrix and a binary $\bar{n} \times \bar{m}$ matrix with reconciliation bits are sent. The parties both construct an $\bar{n} \times \bar{m}$ matrix; from each entry of said matrix, B common bits are extracted. The total number of extracted bits (labeled "length" in the tables below) thus equals $\bar{n} \cdot \bar{m} \cdot B$, while the total number of transmitted bits equals $$n(\bar{n}+\bar{m})\lceil \log_2(q) \rceil + \bar{m} \cdot \bar{n}.$$

Table 1 is a condensed version of the proposed instantiations in Table 2 of Bos.

TABLE 1

Parameter choices from paper Bos

| Scheme | n | q | B | $\bar{n}$ | $\bar{m}$ | Length | Bandwidth |
|---|---|---|---|---|---|---|---|
| Challenge | 352 | $2^{11}$ | 1 | 8 | 8 | 64 | 7.57 KB |
| Classical | 592 | $2^{12}$ | 2 | 8 | 8 | 128 | 14.22 KB |
| Recommended | 752 | $2^{15}$ | 4 | 8 | 8 | 256 | 22.57 KB |
| Paranoid | 864 | $2^{15}$ | 4 | 8 | 8 | 256 | 25.93 KB |

According to Bos, in case that one reconciliation bit is sent, it is guaranteed that the parties agree on a common B-bits secret if their numbers differ less than $2^{m-B-2}$ (where in is such that $q=2^m$). The results with the techniques disclosed herein show that under the same condition, the two parties can agree on a B+1 bits secret if $\delta=m-B-2$ reconciliation bits are sent. The amount of reconciliation data thus equals $\log_2(q)-B-2$ bits per matrix entry, and the total used bandwidth equals $\log_2(q)n(\bar{n}+\bar{m})+\bar{m}\cdot\bar{n}\cdot(\log_2(q)-B-2)$. As in the techniques disclosed herein, the number of bits that is agreed on is larger than in the disclosure of Bos, it is possible to reduce $\bar{n}$ and/or $\bar{m}$ and thus reduce overall bandwidth usage. Using the techniques disclosed herein, the results in Table 2 were obtained. The right-most column (labeled "Ratio") shows the ratio of the used bandwidth of the proposed reconciliation scheme and that of the system disclosed in Bos.

TABLE 2

Improvement that can be achieved by the reconciliation scheme disclosed herein

| Scheme | n | q | B | $\bar{n}$ | $\bar{m}$ | Length | Bandwidth | Ratio |
|---|---|---|---|---|---|---|---|---|
| Challenge | 352 | $2^{11}$ | 2 | 6 | 6 | 72 | 5.84 KB | 0.76 |
| Classical | 592 | $2^{12}$ | 3 | 7 | 7 | 147 | 12.48 KB | 0.88 |
| Recommended | 752 | $2^{15}$ | 5 | 7 | 8 | 280 | 21.22 KB | 0.94 |
| Paranoid | 864 | $2^{15}$ | 5 | 7 | 8 | 280 | 24.37 KB | 0.94 |

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A second device, for reaching agreement on a secret value with a first device, comprising:
   a receiver configured to receive information indicative of a reconciliation data h from the first device, wherein $0 \leq h < 2^\delta$, wherein $\delta$ is an integer greater than 1; and
   a processor circuit configured to compute a common secret s based on an integer value b and an equation $$s \equiv \left\lfloor \frac{b + c - h\frac{q}{2^{B+\delta}} - \frac{q}{2^{B+\delta+1}} + \frac{q}{2^{B+1}}}{\frac{q}{2^B}} \right\rfloor \mod 2^B,$$

wherein b satisfies $0 \leq b < q$, B is a positive integer, and q is an integer multiple of $2^{B+\delta+1}$, wherein q, B, $\delta$, and c are system parameters.

2. The second device of claim 1, wherein the processor circuit is configured to compute b based on a key exchange protocol.

3. The second device of claim 1, wherein the first device has a number a in approximate agreement with the number b, in the sense that $a \equiv b + e \pmod{q}$, wherein e represents a difference between the numbers a and b, wherein $$|e| \leq \frac{q}{2^{B+1}} - \frac{q}{2^{B+\delta+1}}.$$

4. The second device of claim 1, wherein $q = 2^m$ and $\delta = m - B - 1$, wherein m is a positive integer.

5. The second device of claim 1, wherein the processor circuit is configured to compute the value b based on a value $\beta$ and an equation $b \equiv w\beta \pmod{q}$, wherein $wN \equiv 1 \pmod{q}$, wherein N is an integer greater than 1 and is relatively prime to q.

6. A system comprising:
a first device, and
a second device;
wherein the first device comprises:
a first processor circuit configured to:
determine a common secret s based on an integer value a and an equation $$s = \left\lfloor \frac{(a+c) \bmod q}{\frac{q}{2^B}} \right\rfloor,$$

wherein a satisfies $0 \leq a < q$, B is a positive integer, q is an integer multiple of $2^{B+\delta+1}$ wherein $\delta$ is an integer greater than 1, wherein q, B, $\delta$, and c are system parameters, and
determine a reconciliation data h based on an equation $$h = \left\lfloor \frac{((a+c) \bmod q) \bmod \left(\frac{q}{2^B}\right)}{\frac{q}{2^{B+\delta}}} \right\rfloor;$$

and
a transmitter configured to transmit information indicative of the reconciliation data h to the second device,
wherein the number a is in approximate agreement with the number b,
wherein $a \equiv b + e \pmod{q}$, wherein e represents a difference between the numbers a and b, wherein $$|e| \leq \frac{q}{2^{B+1}} - \frac{q}{2^{B+\delta+1}};$$

and
wherein the second device comprises:
a receiver configured to receive information indicative of the reconciliation data h from the first device, wherein $0 \leq h < 2^\delta$; and
a second processor circuit configured to compute the common secret s based on an integer value b and an equation $$s \equiv \left\lfloor \frac{b + c - h\frac{q}{2^{B+\delta}} - \frac{q}{2^{B+\delta+1}} + \frac{q}{2^{B+1}}}{\frac{q}{2^B}} \right\rfloor \bmod 2^B,$$

wherein b satisfies $0 \leq b < q$.

7. A first device for reaching agreement on a secret value with a second device, comprising:
a processor circuit configured to:
determine a common secret s based on an integer value a and an equation $$s = \left\lfloor \frac{(a+c) \bmod q}{\frac{q}{2^B}} \right\rfloor,$$

wherein a satisfies $0 \leq a < q$, B is a positive integer, q is an integer multiple of $2^{B+\delta+1}$, wherein $\delta$ is an integer greater than 1, wherein q, B, $\delta$, and c are system parameters, and determine a reconciliation data h based on an equation $$h = \left\lfloor \frac{((a+c) \bmod q) \bmod \left(\frac{q}{2^B}\right)}{\frac{q}{2^{B+\delta}}} \right\rfloor;$$

and
a transmitter configured to transmit information indicative of the reconciliation data h to the second device.

8. The first device of claim 7, wherein the processor circuit is configured to compute a based on a key exchange protocol.

9. The first device of claim 7, wherein the second device has a number b in approximate agreement with the number a in the sense that $a \equiv b + e \pmod{q}$, wherein e represents a difference between the numbers a and b, wherein $$|e| \leq \frac{q}{2^{B+1}} - \frac{q}{2^{B+\delta+1}}.$$

10. The first device of claim 7, wherein $q = 2^m$, wherein m is a positive integer, the common secret s corresponds to B most significant bits of a binary expansion of $(a+c) \bmod 2^m$, and the reconciliation data h corresponds to next $\delta$ bits of the binary expansion.

11. The first device of claim 10, wherein $\delta = m - B - 1$.

12. The first device of claim 7, wherein at least one of:
c=0 so that the common secret s equals a quotient of a and $$\left(\frac{q}{2^B}\right),$$

rounded downwards to the closest integer;

$$c = \frac{q}{2^{B+1}},$$

so that the common secret s equals a quotient of a and $$\left(\frac{q}{2^B}\right),$$

rounded to the closest integer, wherein rounding is performed upwards in case of a tie; and $$c = \frac{q}{2^{B+1}} - 1,$$

so that the common secret s equals a quotient of a and $$\left(\frac{q}{2^B}\right),$$

rounded to the closest integer, wherein rounding is performed downwards in case of a tie.

13. The first device of claim 7, wherein the processor circuit is configured to compute the value a based on a value $\alpha$ and an equation $a \equiv w\alpha \pmod{q}$, wherein $wN \equiv 1 \pmod{q}$, wherein N is an integer greater than 1, wherein N is relatively prime to q.

14. A method to be performed by a second device for reaching agreement on a secret value with a first device, the method comprising:
receiving information indicative of a reconciliation data h from the first device, wherein $0 \leq h < 2^\delta$, wherein $\delta$ is an integer greater than 1; and
computing a common secret s based on an integer value b and an equation $$s \equiv \left\lfloor \frac{b + c - h\frac{q}{2^{B+\delta}} - \frac{q}{2^{B+\delta+1}} + \frac{q}{2^{B+1}}}{\frac{q}{2^B}} \right\rfloor \mod 2^B,$$

wherein b satisfies $0 \leq b < q$, B is a positive integer, and q is an integer multiple of $2^{B+\delta+1}$, wherein q, B, $\delta$, and c are system parameters.

15. A method to be performed by a first device for reaching agreement on a secret value with a second device, the method comprising:
determining a common secret s based on an integer value a and an equation $$s = \left\lfloor \frac{(a + c) \mod q}{\frac{q}{2^B}} \right\rfloor,$$

wherein a satisfies $0 \leq a < q$, B is a positive integer, q is an integer multiple of $2^{B+\delta+1}$, wherein $\delta$ is an integer greater than 1, wherein q, B, $\delta$, and c are system parameters;
determining a reconciliation data h based on an equation $$h = \left\lfloor \frac{((a + c) \mod q) \mod\left(\frac{q}{2^B}\right)}{\frac{q}{2^{B+\delta}}} \right\rfloor;$$

and
transmitting information indicative of the reconciliation data h to the second device.

16. A non-transitory computer-readable medium comprising a program that, when executed by a processing system, causes the processing system to:
receive information indicative of a reconciliation data h, wherein $0 \leq h < 2^\delta$, wherein $\delta$ is an integer greater than 1; and
compute a common secret s based on an integer value b and an equation $$s \equiv \left\lfloor \frac{b + c - h\frac{q}{2^{B+\delta}} - \frac{q}{2^{B+\delta+1}} + \frac{q}{2^{B+1}}}{\frac{q}{2^B}} \right\rfloor \mod 2^B,$$

wherein b satisfies $0 \leq b < q$, B is a positive integer, and q is an integer multiple of $2^{B+\delta+1}$, wherein q, B, $\delta$, and c are system parameters.

17. A non-transitory computer-readable medium comprising a program that, when executed by a processing system, causes the processing system to:
determine a common secret s based on an integer value a and an equation $$s = \left\lfloor \frac{(a + c) \mod q}{\frac{q}{2^B}} \right\rfloor,$$

wherein a satisfies $0 \leq a < q$, B is a positive integer, q is an integer multiple of $2^{B+\delta+1}$, wherein $\delta$ is an integer greater than 1, wherein q, B, $\delta$, and c are system parameters;
determine a reconciliation data h based on an equation $$h = \left\lfloor \frac{((a + c) \mod q) \mod\left(\frac{q}{2^B}\right)}{\frac{q}{2^{B+\delta}}} \right\rfloor;$$

and
transmit information indicative of the reconciliation data h.

* * * * *